United States Patent [19]
Rand

[11] Patent Number: 6,092,708
[45] Date of Patent: Jul. 25, 2000

[54] VEHICLE STORAGE SUPPORT DEVICE

[76] Inventor: James M. Rand, 10310 Main St., #272, Fairfax, Va. 22030

[21] Appl. No.: 09/015,180

[22] Filed: Jan. 29, 1998

[51] Int. Cl.$^7$ .................................................. B60R 11/00
[52] U.S. Cl. ........................ 224/542; 108/44; 108/147.21; 296/37.16
[58] Field of Search ................................... 224/539, 542, 224/543, 275; 296/37.16, 37.8, 37.5; 108/44, 137, 147.2, 147.19, 147.21, 144.11, 116, 143, 127

[56]  References Cited

U.S. PATENT DOCUMENTS

| | | | |
|---|---|---|---|
| 933,650 | 9/1909 | Kramer | 108/116 |
| 1,851,965 | 4/1932 | Bartholomae et al. | 108/137 |
| 2,425,263 | 8/1947 | Niver | 108/147.21 |
| 2,578,238 | 12/1951 | Goldman . | |
| 2,696,246 | 12/1954 | Putnam | 108/144.11 |
| 2,889,097 | 6/1959 | Broehl . | |
| 4,228,745 | 10/1980 | Gale | 108/116 |
| 4,715,296 | 12/1987 | Wilkinson | 108/116 |
| 4,938,519 | 7/1990 | Schlachter et al. . | |
| 4,962,709 | 10/1990 | Huber | 108/44 |
| 5,107,775 | 4/1992 | Langlais et al. | 108/147.21 |
| 5,394,809 | 3/1995 | Feldpausch et al. | 108/147.21 |
| 5,441,183 | 8/1995 | Frenzel . | |
| 5,479,866 | 1/1996 | Rae | 108/44 |
| 5,598,962 | 2/1997 | Schlachter . | |

*Primary Examiner*—Linda J. Sholl
*Attorney, Agent, or Firm*—Mcguire, Woods, Battle & Boothe, LLP.

[57]  ABSTRACT

The present invention provides for a vehicle storage support device for easy installation into and removal from a vehicle's rear storage compartment. The device has a generally horizontally extending top platform that has ends that are rotatably connected to vertical support panels. The top platform has a length adjustment means and the vertical support panels have a height adjustment means that allows the device to be adjusted to snugly fit the interior of the rear storage compartment.

11 Claims, 6 Drawing Sheets

VEHICLE STORAGE SUPPORT DEVICE

FIELD OF THE INVENTION

The present invention relates to a storage support device for a vehicle, and more particularly toward a foldable and adjustable storage support device for a vehicle.

BACKGROUND OF THE INVENTION

There has been an increased interest in the use of a storage support device for vehicles, such as mini-vans and sport-utility type vehicles. These vehicles have a rear lifting hatch or rear opening doors and a rear storage compartment, which provides room for using a storage support device in the rear storage compartment. Examples of known devices include the device described in U.S. Pat. No. 5,598,962 titled "Security Trunk for Support Utility Vehicles." The 962 patent describes a removable security trunk for a vehicle having a rear access opening with a width that is less than the width of vehicle's rear cargo compartment. The security trunk in the 962 patent has a top panel that extends across the vehicle's rear cargo compartment and is supported by two vertical partitions spaced apart to provide three separate cargo compartments. Another example of such a storage device is described in U.S. Pat. No. 5,441,183 titled "Vehicular Compartmentalizer Unit." The 183 patent is directed toward a free-standing storage unit adapted for installation in a vehicle having an interior cargo receiving area. The 183 patent unit includes a platform that has a hinge trap door and an underlying supportive wall. The trap door provides access to one or more storage compartments.

The above-described storage devices and other currently known devices, however, do not provide for a vehicle storage support device that is adjustable in height and length without the use of any tools, and which can be folded to become portable and compact. The currently known devices do not disclose or suggest a vehicle storage support device that can be quickly adjusted to cover the interior width of the rear storage compartment thus allowing for items to be placed on top or below of the storage device. The currently known devices also do not suggest or disclose a vehicle storage support device that can be quickly removed from the vehicle and folded for storage or be placed on the floor of the rear storage compartment.

Further, the currently known devices do not disclose or suggest a vehicle storage support device that when folded or collapsed, has an approximate thickness of 1½ inches. Additionally, the currently known devices do not describe a vehicle storage support device that can be adjusted in height without the use of tools and which has an adjustable range from approximately 10 to 30 inches. This height adjustment of 20 inches is approximately the width of two suitcases thereby allowing for two suitcases to be placed under the device's top platform.

Accordingly, there is a need for a vehicle storage support device that has an easy adjustable height and length, which allows the device to conform to the side-to-side width of the rear storage compartment of the vehicle. The length of such a vehicle storage support device can be extended such that its length ranges from approximately 30 to 58 inches. The complete side-to-side length adjustment of such vehicle storage support device is important as it provides for a portable, non-permanent installation of the device while ensuring a semi-secure installation of the device. This is because the device can be placed in the vehicle and use the interior sides of the vehicle's rear storage compartment to help support and keep the device in place.

Thus, it is among the objects of the invention to provide a vehicle storage support device that is easily adjustable in height and length, and can be folded for easy removal or storage.

It is another object of the present invention to provide a vehicle storage support device that is easy to manufacture and use.

SUMMARY OF THE INVENTION

These and other objects and advantages of the present invention are accomplished by providing a free-standing vehicle storage support device adapted for installation in and removal from a motor vehicle having an interior storage space. The vehicle storage support device has a generally horizontally extending top platform that has spaced apart ends which are rotatably connected to vertical support panels. The top platform has a length adjustment means and the vertical support panels have a height adjustment means. The vertical support panels also have a front surface with a portion of the front surface having a raised contact surface for placement against the interior side walls of the interior storage space.

BRIEF DESCRIPTION OF THE DRAWINGS

Some of the objects and advantages of the invention having been stated, other objects will appear as the description proceeds when taken in conjunction with the accompanying drawings in which.

DETAILED DESCRIPTION OF THE PREFERRED EMBODIMENT

While the present invention will be described more fully hereinafter with reference to the accompanying drawings in which particular embodiments of the invention are shown, it is to be understood at the outset that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
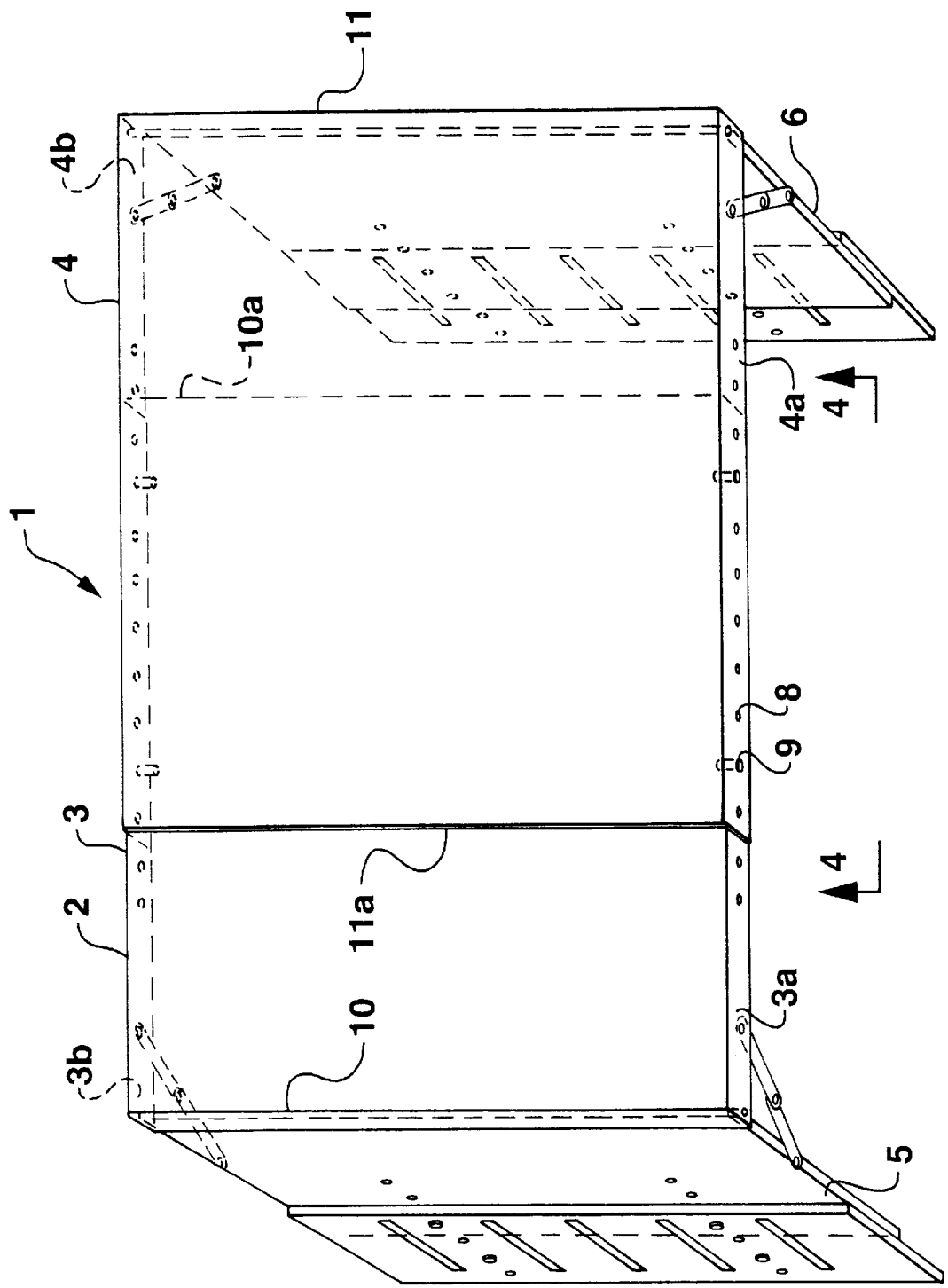
FIG. 1 is a perspective view of the vehicle storage support device in accordance with the present invention.

A preferred form of the vehicle storage support device 1 is illustrated in FIG. 1 and is shown to consist of a generally horizontally extending top platform 2 that is generally rectangular in shape. The top platform 2 is adapted to be rotatably supported by spaced apart vertical support panels 5 and 6.

Figure 4:
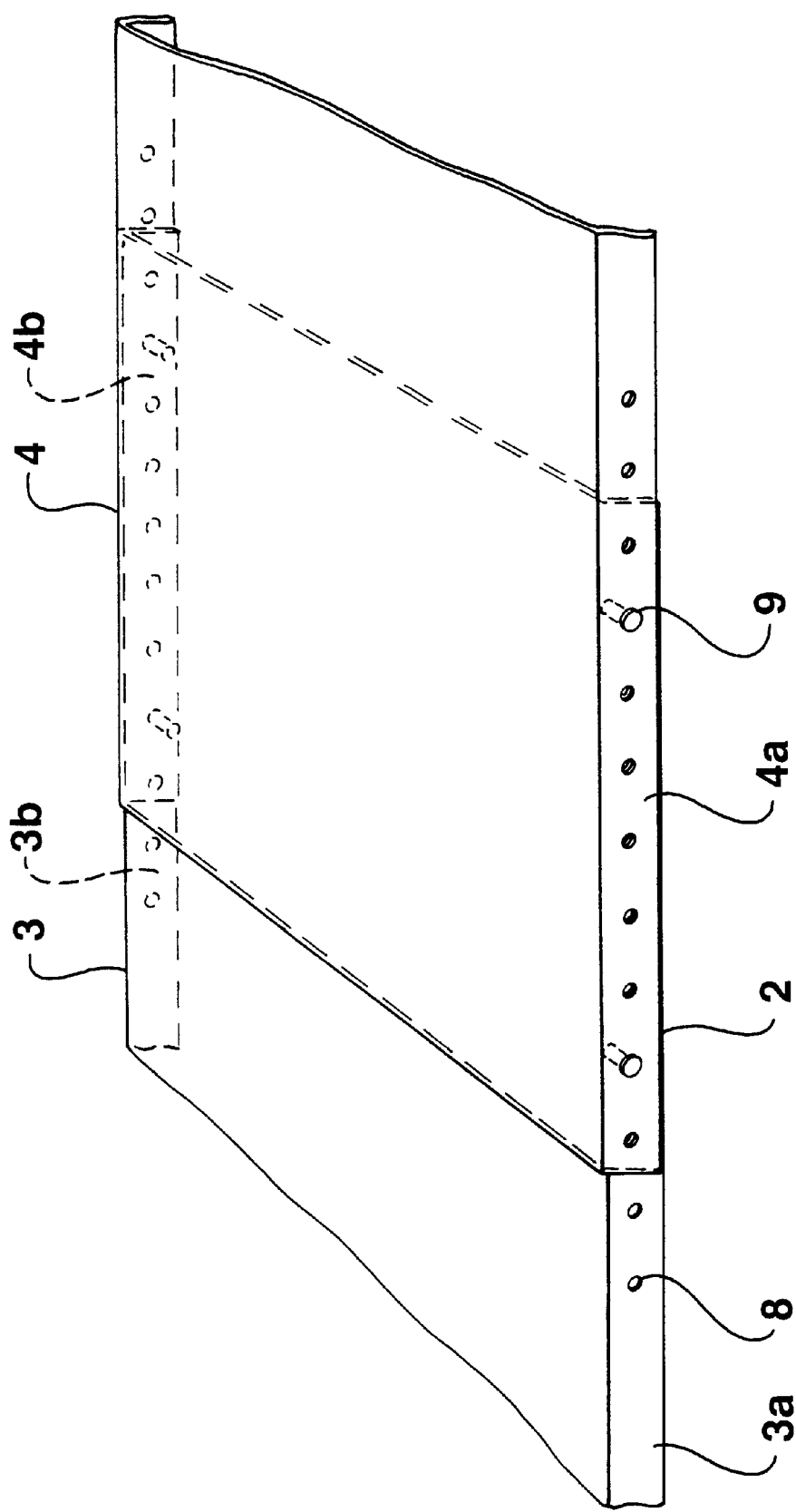
FIG. 4 is a side sectional view of the top platform of the vehicle storage support panel shown in FIG. 1 taken along lines 4—4.

The top platform 2 is shown to consist of two platform members 3 and 4, which are generally rectangular in shape. The platform members 3 and 4 have spaced apart sides 3a, 3b and 4a, 4b, respectively. The spaced apart sides 3a, 3b and 4a, 4b are approximately 1 inch wide. The platform members 3 and 4 also have spaced apart opposite ends 10, 10a and 11, 11a, respectively. The opposite end 10 of platform member 3 and the opposite end 11 of platform member 4 have an edge that is approximately 1 inch wide, while the opposite ends 10a and 11a of platform members 3 and 4, respectively, are only approximately ¼ inch wide. Platform member 3 is adapted to be easily slid into and removed from platform member 4, such that opposite end 10a is slid underneath opposite end 11a of platform member 4 and sides 3a and 3b of platform member 3 are placed adjacent to the inner sides of sides 4a and 4b of platform member 4. As shown in FIGS. 1 and 4, the sides 3a, 3b and 4a, 4b of platform members 3 and 4, respectively, have holes 8 that spaced along the sides 3a, 3b and 4a, 4b of the platform members 3 and 4, respectively. When the platform member 3 is slid into platform member 4 such that sides 3a and 3b are placed against the inner sides of sides 4a and 4b, and the holes 8 of the sides of the platform members 3 and 4 are aligned, pins 9 can be inserted within the holes 8 to keep the sides from moving. By sliding platform member 3 into platform member 4 and using the pins 9, the width of the top platform can be adjusted. The holes 8 are spaced approximately ½ inch to 1 inch apart and allow the top platform to have a length that ranges from approximately 30 inches to 58 inches.

Figure 2:
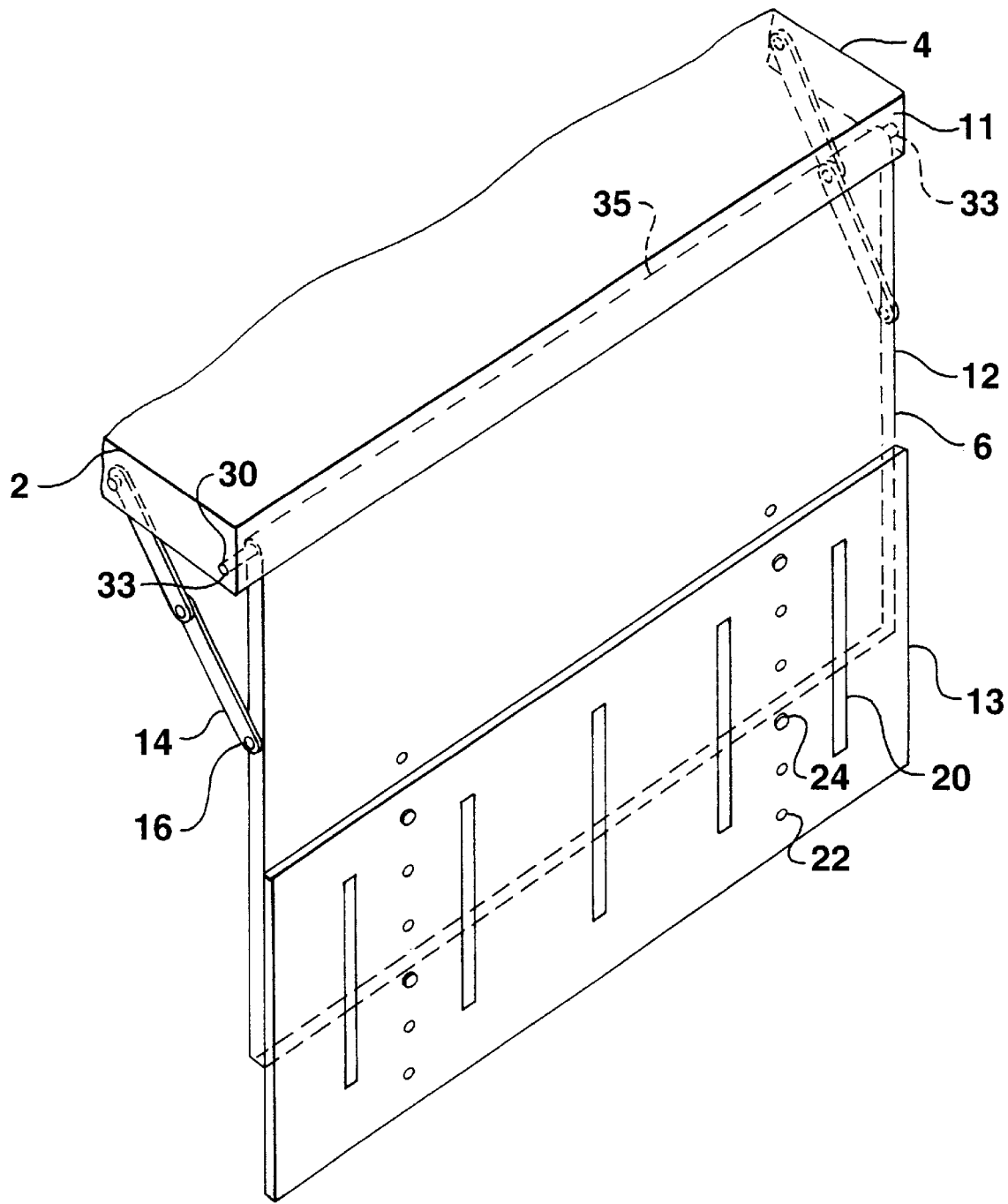
FIG. 2 is an enlarged sectional view of the right vertical support panel floor of the vehicle storage support device shown in FIG. 1.
Figure 3:
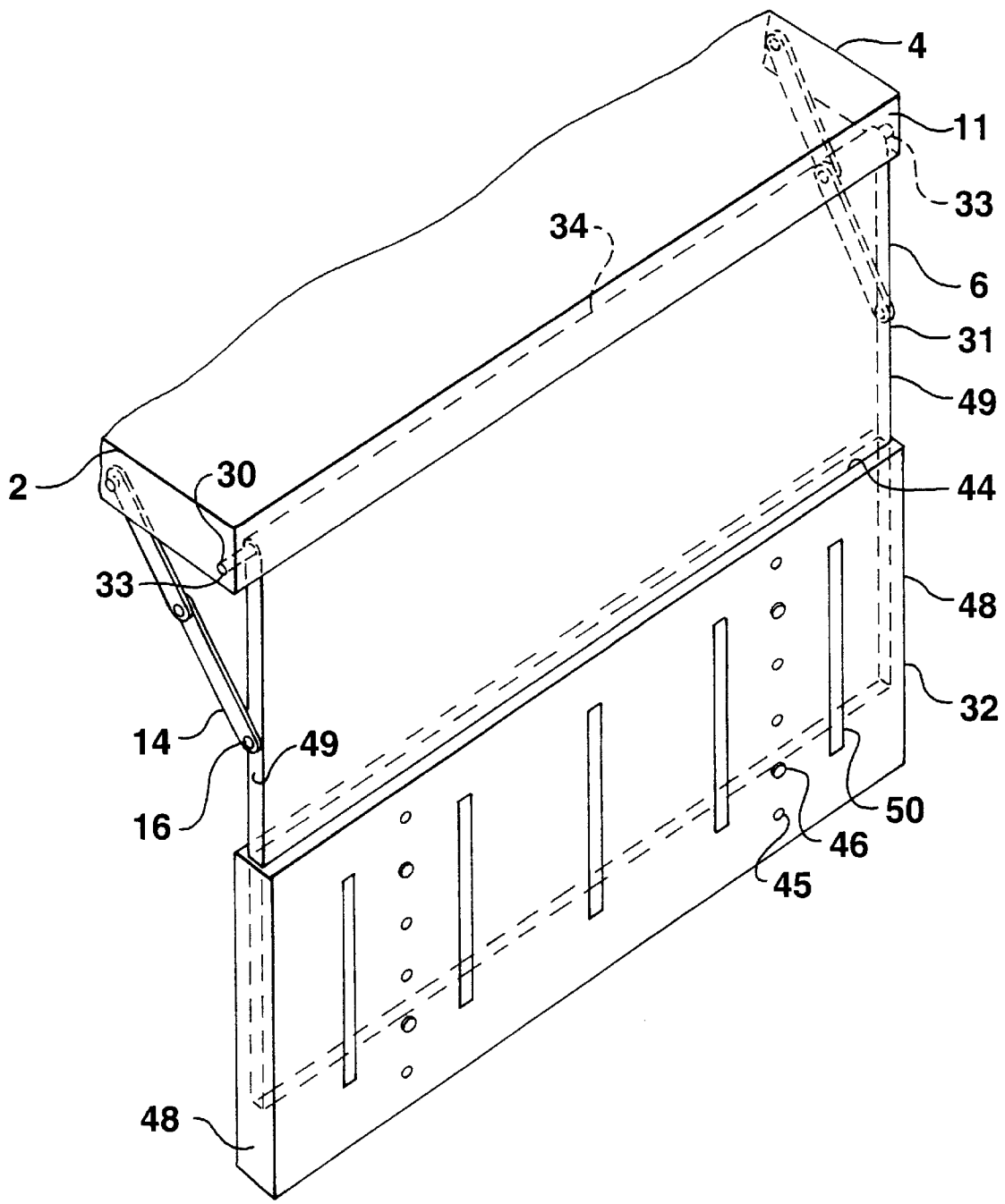
FIG. 3 is an enlarged sectional view of an alternate embodiment of the right vertical support panel for the vehicle storage support device.

As shown in FIGS. 1, 2 and 3, sides 3a, 3b and 4a, 4b of the platform members 3 and 4, respectively, have a hole 33 located near the ends 10 and 11 of the platform members 3 and 4, respectively. The holes 33 are adapted to receive a rod 30 that rotateably connects the vertical side panels 5 and 6 to the top platform 2, as discussed further below. Further, the sides 3a, 3b and 4a, 4b of the platform members 3 and 4, respectively, have a finger activated leg catch 14 that is connected to the vertical support panels 5 and 6 and which are used to keep the vertical support panels 5 and 6 in an extended position that is at a 90 degree angle to the top platform 2.

As shown in FIGS. 1 and 2, the vertical support panels 5 and 6 each consist of first and second panel members 12 and 13 that are generally rectangular in shape and are approximately ½ inch thick. The rods 30 are inserted through a channel 35 that is formed at the top edge of first panel member 12. The panel members 12 and 13 are shown to have 2 spaced apart rows of holes 22 that extend through the panel members 12 and 13 and are approximately 1½ inches apart. The holes 22 and adapted to receive removable pins 24 such that when panel member 13 is placed against panel number 12 and panel member 13 partially covers panel member 12 and the holes 22 are in alignment, at least two pins 24 can be inserted within the holes 22 as shown in FIG. 2, to adjust the height of the device 1. By adjusting the placement of panel member 13 over panel member 12 and with the use of pins 24, the device 1 has a height that ranges from 10 inches to 30 inches. The panel member 13 additionally has several raised vertical surfaces or rows that act as a contact surface such that when the panel member 13 is placed against a surface, the raised contact surfaces 20 are adapted and designed to act as a non-skid surface to assist in keeping the platform member 13 from moving. The panel member 12 has placed apart sides that have rotatable connectors for connecting the leg catches 14 to the top platform 2. As shown on FIG. 1, the vertical support panels 5 and 6 are identical in design.

Figure 6:
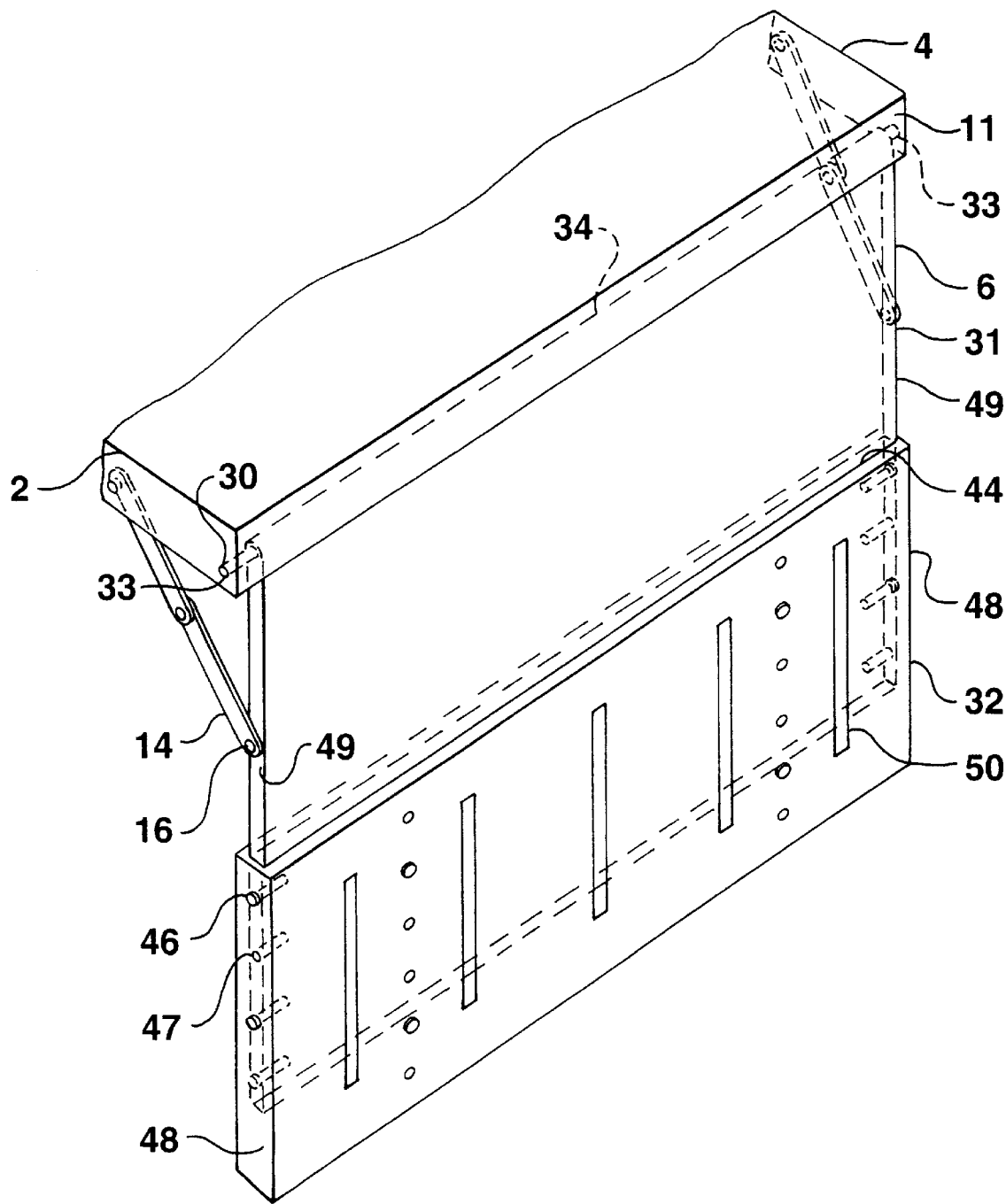
FIG. 6 is an enlarged sectional view of an alternative embodiment of the right vertical support panel for the vehicle storage support device.

Referring now to FIG. 3, an alternate embodiment of the vertical support panels 5 and 6 is shown to consist of third and fourth panel members 31 and 32, respectively, that are generally rectangular in shape. The third panel member 31 has an approximate thickness of ½ inch and is shown rotatably connected to the top platform 2 via the rod 30 that is inserted through a channel 34 formed at the top edge of the third panel number 31. The fourth panel number 32 is approximately ¾ of an inch in width and has a slot 44 that is formed along the upper edge of the fourth panel number 32 and extends approximately ⅔rds within the fourth panel number 32. The third and fourth panel numbers have two rows of holes 45 that are spaced approximately ½ inch apart. The holes 45 are adapted to receive pins 46 that extend through the holes 45 formed along the front surface of the fourth panel number 32, through the holes 45 formed in the third panel number 30 and partially into the back surface of the fourth panel number 32. Alternately, instead of having holes 45 formed along the front surfaces of the third and fourth panel numbers 30 and 32, holes 47 can be formed along the side 48 of the fourth panel number 32 into the slot 44, as shown in FIG. 6. The third panel number 30 also has coinciding holes 47 that are formed along the sides 49 of the third panel number 30. When the third panel number 30 is inserted within the slot 44 of the fourth panel number 32, and the holes 47 of the third and fourth panel members 30 and 32 are aligned, a pin 46 can be inserted within the holes 47.

Further, the fourth panel number 32 has several raised vertical contact surfaces 50 on its front surface that are used to prevent the vertical panel numbers 5 and 6 from sliding when the vertical panel numbers 5 and 6 are placed against another surface and are in the extended 90 degree angle to the top panel position.

Figure 5:
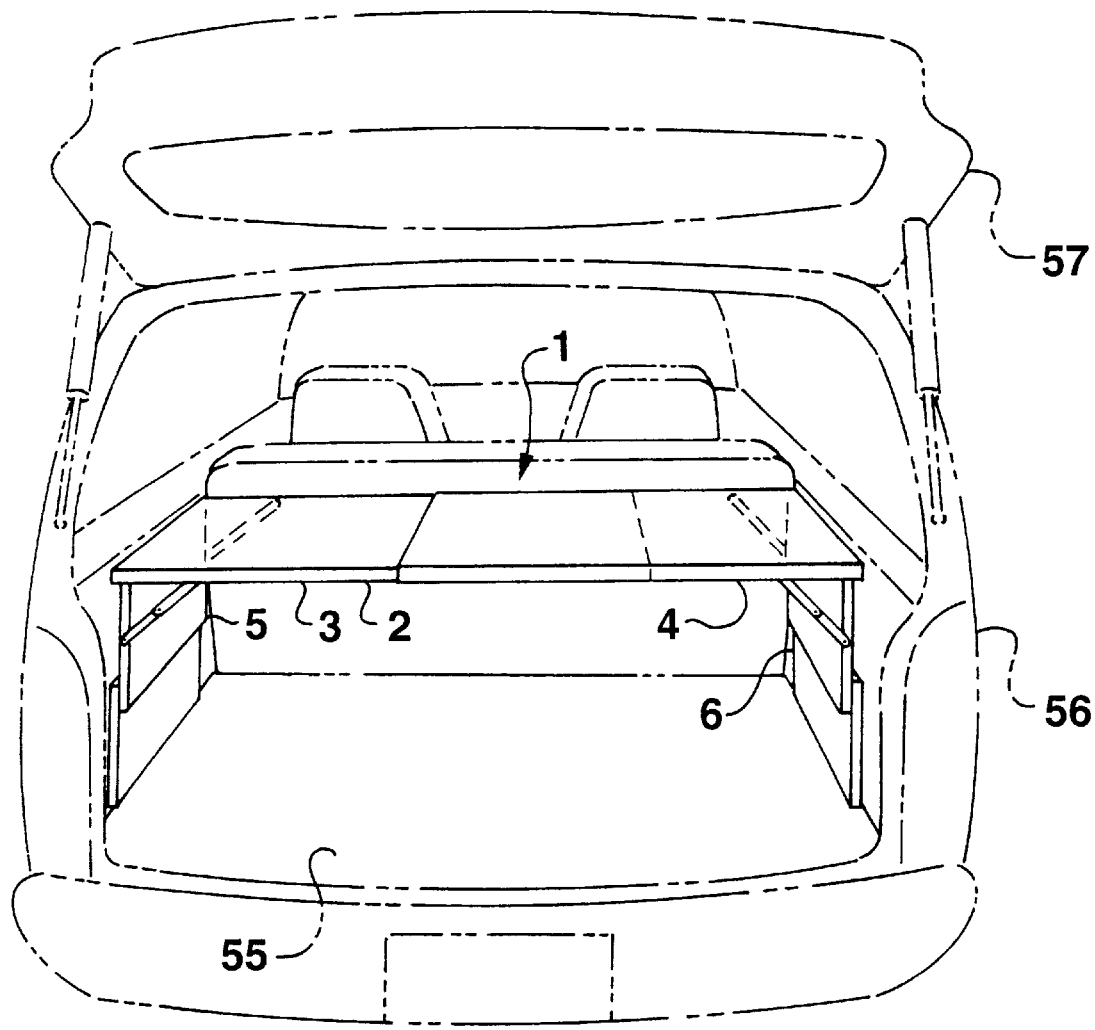
FIG. 5 is a view of a sport-utility type vehicle with its liftgate in the raised position showing the vehicle storage support device shown in FIG. 1 inserted within the vehicle's rear storage compartment.

Referring to FIG. 5, the device 1 is shown installed within the rear interior storage space 55 of a vehicle 56 having a lifting hatch or door 57. The rear interior storage space 55 is formed by the interior spaced apart sidewalls of the vehicle 56 and the backrest of a seat having a rear back rest surface. When the width of the device 1 has been adjusted such that the vertical side panels 5 and 6 make contact with the interior spaced apart side walls of the vehicle 56, the raised contact surfaces 20 or 50 help prevent the device 1 from moving within the rear interior storage space 55. The device 1 can have its height adjusted such that the top platform 2 is equal or slightly below the height of the rear back rest surface.

SUMMARY

In operation, the device 1 is designed to have its length and height adjusted by simply removing the pins 9, 24, 46 from their respective holes 8, 22, 45 or 47. Once the desired length and height has been selected, the pins can be reinserted into the respective holes to secure the desired length and height. The device 1 has an approximate thickness of 1½ inches when in its collapsed and folded position, and can be stored on the floor of the rear interior storage space 55 of the vehicle 56, or can be taken out of the vehicle 56 and stored elsewhere. When the device 1 has its vertical side panels 5 and 6 in their extended 90° angle position and the finger activated leg catches 14 are in their extended positions, items can be placed on top and/or below of the top platform 2. The device 1 has an adjustable height of 10 to 30 inches. The maximum height adjustment is approximately the width of two suitcases. The device 1 can also be used in a lower position such that only one suitcase can fit under the top platform 2, and larger items can be placed on top of the top platform 2. The device 1 is not intended to be extended higher than at least 1 inch below the top of the rear seat to avoid obstructing the rear view of the driver. The device 1 is designed to be portable and does not need have to be permanently installed in the rear interior storage space 55 of the vehicle 56. The device 1 has an adjustable length that is made to conform to the side to side width of the rear interior storage 55 space, with the adjustable length ranging from 30 to 58 inches. The complete side to side extension or length adjustment of the device 1 is important to the portable, non-permanent use of the device 1 to ensure a semi-secure installation of the device 1 within the vehicle 56. The device 1 can be placed in the vehicle 56 and with the use of the raised contact surfaces 20 or 50 on the vertical side panels 5 and 6 help to secure the device in place. The raised contact surfaces are adapted to act as a wedging means to help stabilize the device 1 within the vehicle 56 and can be made from any number of materials or have different configurations or appearances, such as soft rubber, fabric, raised ridges in the panel, etc.

The top panel 2 is shown to consist of two separate panel members 3 and 4 which are designed to have the first panel number 3 to be slid under the second panel number 4 and slid together for adjusting the length of the device 1. The panel members 3 and 4 are secured together through the use of pins 9 that are inserted into the holes 8 formed along the sides of the panel members 3 and 4.

I claim:

1. A free-standing vehicle storage support device adapted for installation in and removal from a motor vehicle having an interior storage space formed by spaced apart side walls, a seat with a back rest having a rear back rest surface, and a rear lifting hatch or door, said device comprising:
   a) a generally horizontally extending platform having spaced apart first and second ends defining a platform length dimension and rotatably connected to first and second vertical support panels, respectively, and means for adjusting said platform length and having spaced apart front and rear edges defining a platform width dimension;
   b) wherein each vertical support panel has a height dimension and means for adjusting the height dimension of said each vertical support panel and wherein said each vertical support panel has a front panel edge and a rear panel edge defining a width dimension that is substantially equal to said platform width dimension and a substantially vertical surface with a portion of the substantially vertical surface having a plurality of elongate, generally parallel, vertically oriented raised contact surfaces for placement against one of the spaced apart side walls of the interior storage space.

2. The free-standing vehicle storage support device set forth in claim 1, wherein the top platform consists of a first generally horizontal platform member adapted to be inserted into and partially removed from a second generally horizontal platform member, the first and second platform members each have spaced apart first and second sides, and the means for adjusting said platform length dimension includes at least two spaced apart first openings formed along each of the first and second sides and first pins that are adapted to be removably inserted within the first openings when the first platform member is inserted within the second platform and the first openings of the first and second sides of the first and second platform members are in alignment.

3. The free-standing vehicle storage support device set forth in claim 1, wherein the first and second vertical support panels each consist of first and second panel members that have front and back panel member surfaces, and the means for adjusting the height dimension of said each vertical support panel includes at least two second openings formed along each of the front panel member surfaces and second pins that are adapted to be removably inserted within the second openings when the first panel member is placed immediately adjacent to the second panel member and the second openings of the first and second support panel members are in alignment.

4. The free-standing vehicle storage support device set forth in claim 1, wherein the first and second vertical support panels each have a top edge that has a channel formed therein and a rod placed within the channel, the rod has spaced apart first and second rod ends that are rotatably connected to the first and second ends of the top platform, respectively.

5. The free-standing vehicle storage support device set forth in claim 1, wherein the first and second vertical panels each consist of third and fourth panel members that have front and back panel member surfaces, the third panel members being rotatably connected to the top platform, the fourth panel members each have a slot formed along the upper top edge of the fourth panel member, the third panel members are adapted to be removably inserted within the slots, and the means for adjusting the height dimension of said each vertical support panel includes at least two third openings formed along each of the front panel member surfaces and third pins that are adapted to be removably inserted within the third openings when the third panel member is inserted within the slot and the third openings of the third and fourth panel members are in alignment.

6. A free-standing vehicle storage support device adapted for installation in and removal from a motor vehicle having an interior storage space formed by spaced apart side walls, a seat with a back rest having a rear back rest surface, and a rear lifting hatch or door, said device comprising:
   a) a generally horizontally extending top platform having a first platform member adapted to be inserted into and partially removed from a second platform member, the first and second platform members each having spaced apart first and second sides, the first platform member having a first end and the second platform member having a second end that are rotatably connected to first and second vertical support panels, respectively, said first end of said first platform member and said second end of said second platform member defining a platform length dimension, said top platform also having means for adjusting said platform length dimension;
   b) wherein the means for adjusting said platform length dimension includes at least two spaced apart first openings formed along each of the first and second sides and first pins that are adapted to be removably inserted within the first openings when the first platform member is inserted within the second platform and the first openings of the first and second sides of the first and second platform members are in alignment; and
   c) wherein each vertical support panel has a height dimension and means for adjusting the height dimension of said each vertical support panel and wherein said each vertical support panel has a front panel edge and a rear panel edge defining a width dimension that is substantially equal to said platform width dimension and a substantially vertical surface with a portion of the substantially vertical surface having a plurality of elongate, generally parallel, vertically oriented raised contact surfaces for placement against one of the spaced apart side walls of the interior storage space.

7. The free-standing vehicle storage support device set forth in claim 6, wherein the first and second vertical support panels each consist of first and second panel members that have front and back panel member surfaces, and the means for adjusting the height dimension of said each vertical support panel includes at least two second openings formed along each of the front panel member surfaces and second pins that are adapted to be removably inserted within the second openings when the first panel member is placed immediately adjacent to the second panel member and the second openings of the first and second support panel members are in alignment.

8. The free-standing vehicle storage support device set forth in claim 6, wherein the first and second vertical panels each consist of third and fourth panel members that have front and rear surfaces, the third panel numbers being rotatably connected to the top platform, the fourth panel members each have a slot formed along the upper top edge of the fourth panel member, the third panel members are adapted to be removably inserted within the slots, and the means for adjusting the height dimension of said each vertical support panel includes at least two third openings formed along each of the front surfaces and third pins that are adapted to be removably inserted within the third openings when the third panel member is inserted with the slot and the third openings of the third and fourth panel members are in alignment.

9. The free-standing vehicle storage support device set forth in claim 6, wherein the first and second vertical support panels each have a top edge that has a channel formed therein and a rod placed within the channel, the rod has spaced apart first and second rod ends that are rotatably connected to the first and second ends of the first and second platform members, respective.

10. A free-standing vehicle storage support device adapted for installation in and removal from a motor vehicle having an interior storage space formed by spaced apart side walls, a seat with a back rest having a rear back rest surface, and a rear lifting hatch or door, said device comprising:

a) a generally horizontally extending top platform having a first platform member adapted to be inserted into and partially removed from a second platform member, the first and second platform members each having spaced apart first and second sides, the first platform member having a first end and the second platform member having a second end that are rotatably connected to first and second vertical support panels, respectively, said first end of said first platform member and said second end of said second platform member defining a platform length dimension, said top platform also having means for adjusting said platform length dimension;

b) wherein the means for adjusting said platform length dimension includes at least two spaced apart first openings formed along each of the first and second sides and first pins that are adapted to be removably inserted within the first openings when the first platform member is inserted within the second platform and the first openings of the first and second sides of the first and second platform members are in alignment; and c) wherein each vertical support panel has a height dimension and means for adjusting the height dimension of said each vertical support panel and wherein said each vertical support panel has a front panel edge and a rear panel edge defining a width dimension that is substantially equal to said platform width dimension and a substantially vertical surface with a portion of the substantially vertical surface having a plurality of elongate, generally parallel, vertically oriented raised contact surfaces for placement against one of the spaced apart side walls of the interior storage space, and wherein the first and second vertical support panels each consist of first and second panel members that have front and back panel member surfaces, and the means for adjusting the height dimension of said each vertical support panel includes at least two second openings formed along each of the front panel member surfaces and second pins that are adapted to be removably inserted within the second openings when the first panel member is placed immediately adjacent to the second panel member and the second openings of the first and second support panel members are in alignment.

11. The free-standing vehicle storage support device set forth in claim 10 wherein the first and second vertical support panels each have a top edge that has a channel formed therein and a rod placed within the channel, the rod has spaced apart first and second rod ends that are rotatably connected to the first and second ends of the top platform, respectively.

* * * * *